United States Patent [19]
Torii et al.

[11] Patent Number: 5,263,025
[45] Date of Patent: Nov. 16, 1993

[54] COMMUNICATION SYSTEM AND EQUIPMENT

[75] Inventors: Nobuyoshi Torii; Yuko Motoki; Takashi Morita, all of Yokohama, Japan

[73] Assignee: Hitachi, Ltd., Tokyo, Japan

[21] Appl. No.: 800,248

[22] Filed: Nov. 29, 1991

[30] Foreign Application Priority Data

Nov. 30, 1990 [JP] Japan ................... 2-329089

[51] Int. Cl.$^5$ .......................... H04J 3/22; H04J 3/16
[52] U.S. Cl. ................................ 370/94.2; 370/95.1
[58] Field of Search ................... 370/60, 60.1, 94.1, 370/94.2, 62, 58.1, 58.2, 58.3, 95.1; 379/53, 54, 93, 94

[56] References Cited

U.S. PATENT DOCUMENTS 4,870,641  9/1989  Pattavina ........................ 370/94.1
5,164,938  11/1992 Jurkevich et al. ................ 370/94.2

FOREIGN PATENT DOCUMENTS

296530  12/1988  Japan .
138837  5/1989  Japan .

*Primary Examiner*—Wellington Chin
*Attorney, Agent, or Firm*—Antonelli, Terry, Stout & Kraus

[57] ABSTRACT

A communication system having an exchange network which can execute a communication procedure necessary for setting of a communication bandwidth with a party variable bandwidth terminal to make the most of characteristic of a terminal which can change its communication bandwidth during communication and to obtain as many call interconnections as possible. The exchange network includes a variable terminal attribute memory device for storing therein the types and ranges of variable bandwidths of the terminals, a bandwidth decision device for determining bandwidths allocated to the respective terminals, and a control data communication device for transmitting at least an allocated bandwidth data to the associated terminal. The variable bandwidth terminal at least includes a control data communication device for receiving the allocated bandwidth data from the exchange network, a line management device for performing access management of lines, and a terminal control device for determining a communication band-width based on the allocated bandwidth data received from the exchange network and the then terminal state to execute a communication procedure with the party terminal and to operate the line management device to increase or decrease the communication bandwidth.

26 Claims, 7 Drawing Sheets

| TERMINAL EXTENSION LINE No. | COMMUNICATION BAND ||
|---|---|---|
| | TYPE | RANGE |
| 110 OR 210 | VARIABLE | 384KbPS/768KbPS |
| 120 OR 220 | FIXED | 64KbPS |
| 130 OR 230 | FIXED | 384KbPS |
| | | |

FIG. 5B

| TERMINAL EXTENSION LINE No. | COMMUNICATION BAND ||
|---|---|---|
| | TYPE | RANGE |
| 110 OR 210 | VARIABLE | AM / PM<br>0/384KbPS/768KbPS/1152KbPS |
| 120 OR 220 | FIXED | 64KbPS |
| 130 OR 230 | FIXED | 1536KbPS |
| | | |

COMMUNICATION SYSTEM AND EQUIPMENT

BACKGROUND OF THE INVENTION

The present invention generally relates to communication systems and equipments having a plurality of terminals and an exchange network and, more particularly, to a system for interconnecting an exchange network and a terminal having a communication ability with a plurality of communication band widths as a television conference system.

In a prior art system, a control circuit in a distributed module sets a communication band at a send/receive line circuit according to an idle band of a communication channel as disclosed in JP-A-63-296530, whereas a controller in a network interface instructs a communication band to the terminal controller of a terminal interface according to the value of a traffic status from a network to take a coincidence in communication band between variable band terminals as disclosed in JP-A-1-138837.

However, the prior art system has had such a problem that no consideration is paid to such a system as to perform direct communication band data exchange between terminals to take a communication band coincidence therebetween and thus the prior art system cannot be applied to a television conference system or the like.

SUMMARY OF THE INVENTION

It is therefore an object of the present invention to provide a communication system and equipment which can execute a communication procedure necessary for setting of a communication band width with a party variable band terminal to make the most of the characteristic of a terminal which can change its communication band width during communication and to obtain as many call interconnections as possible.

In accordance with the present invention, a system for connecting an exchange network and a plurality of communicatable terminals each having a plurality of communication bands is arranged so that the exchange network can issue a communication band width change request notification to the associated terminal, whereas the terminal, when receiving the notification, decides whether or not its band width is changed depending on the then state of the terminal and when determining the change of the band width, executes a procedure necessary for the band width change with the party communication terminal.

Since the communication band is determined depending on the communication between the terminals in this way, the communication system can have many call interconnections even during communication between such terminals demanding a wide band as television conference devices.

DESCRIPTION OF THE PREFERRED EMBODIMENTS

Figure 1A:
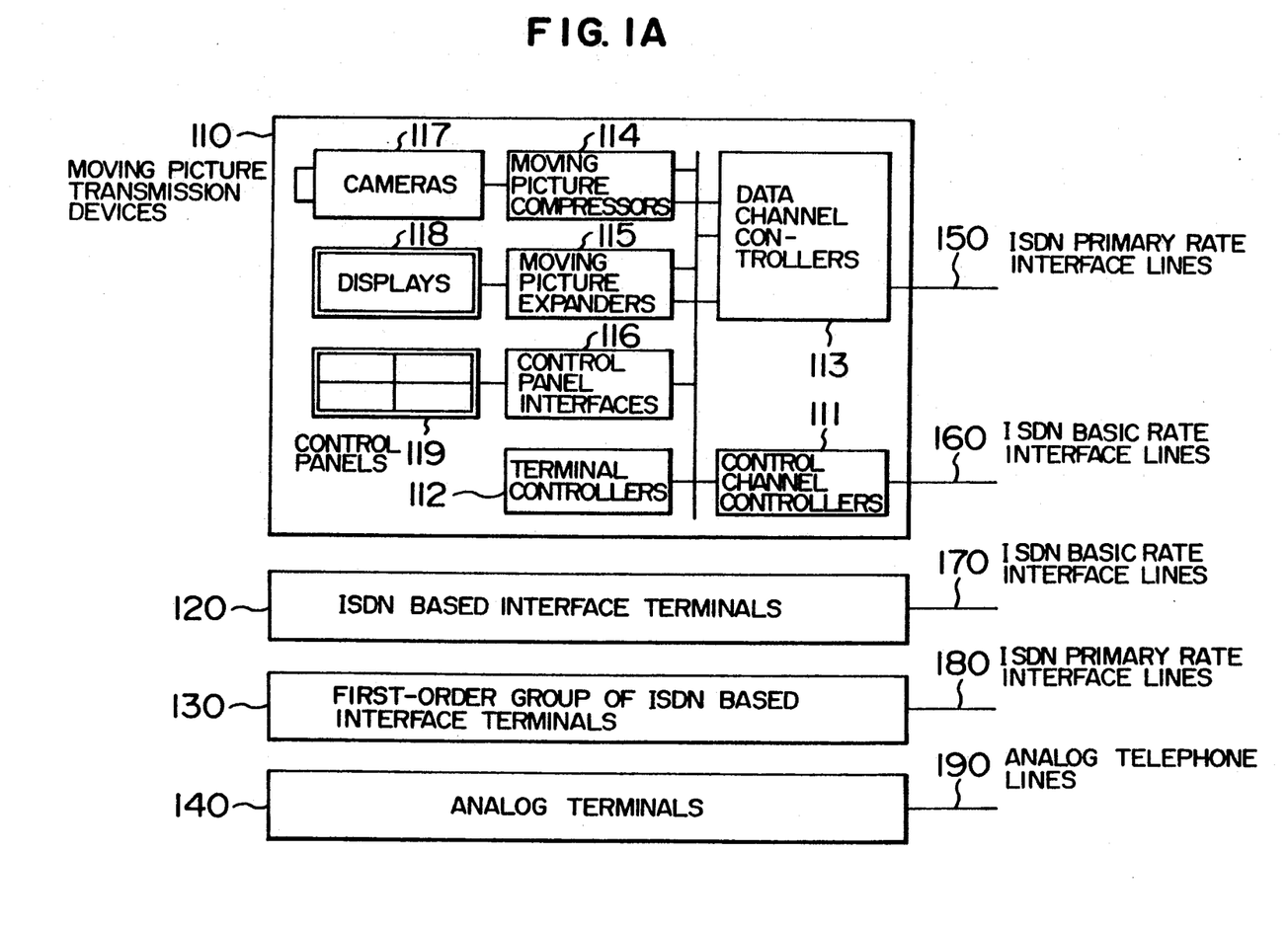
FIG. 1A, FIG. 1B, FIG. 1C are an arrangement of a communication system in accordance with an embodiment of the present invention.
Figure 1B:
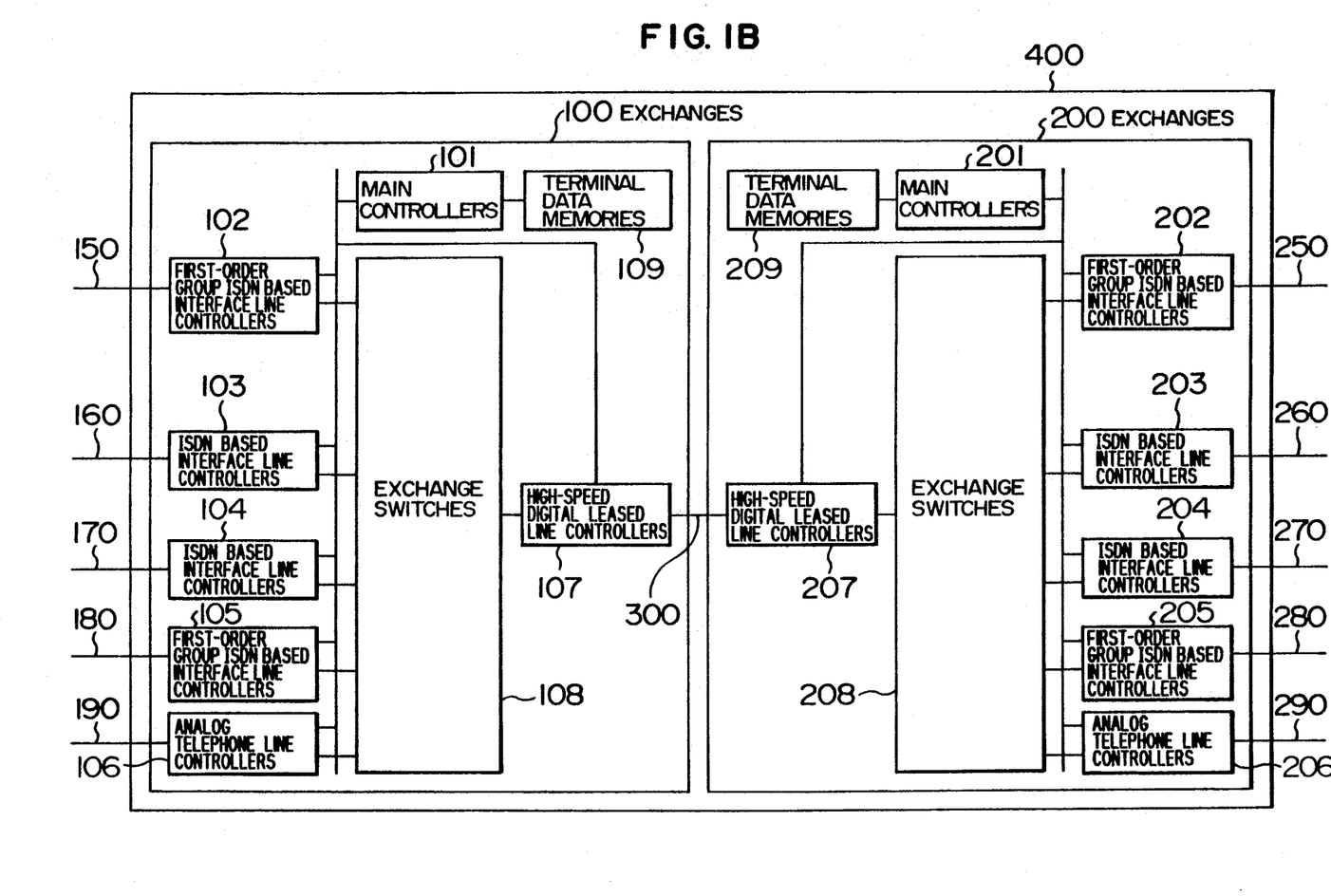
Figure 1C:
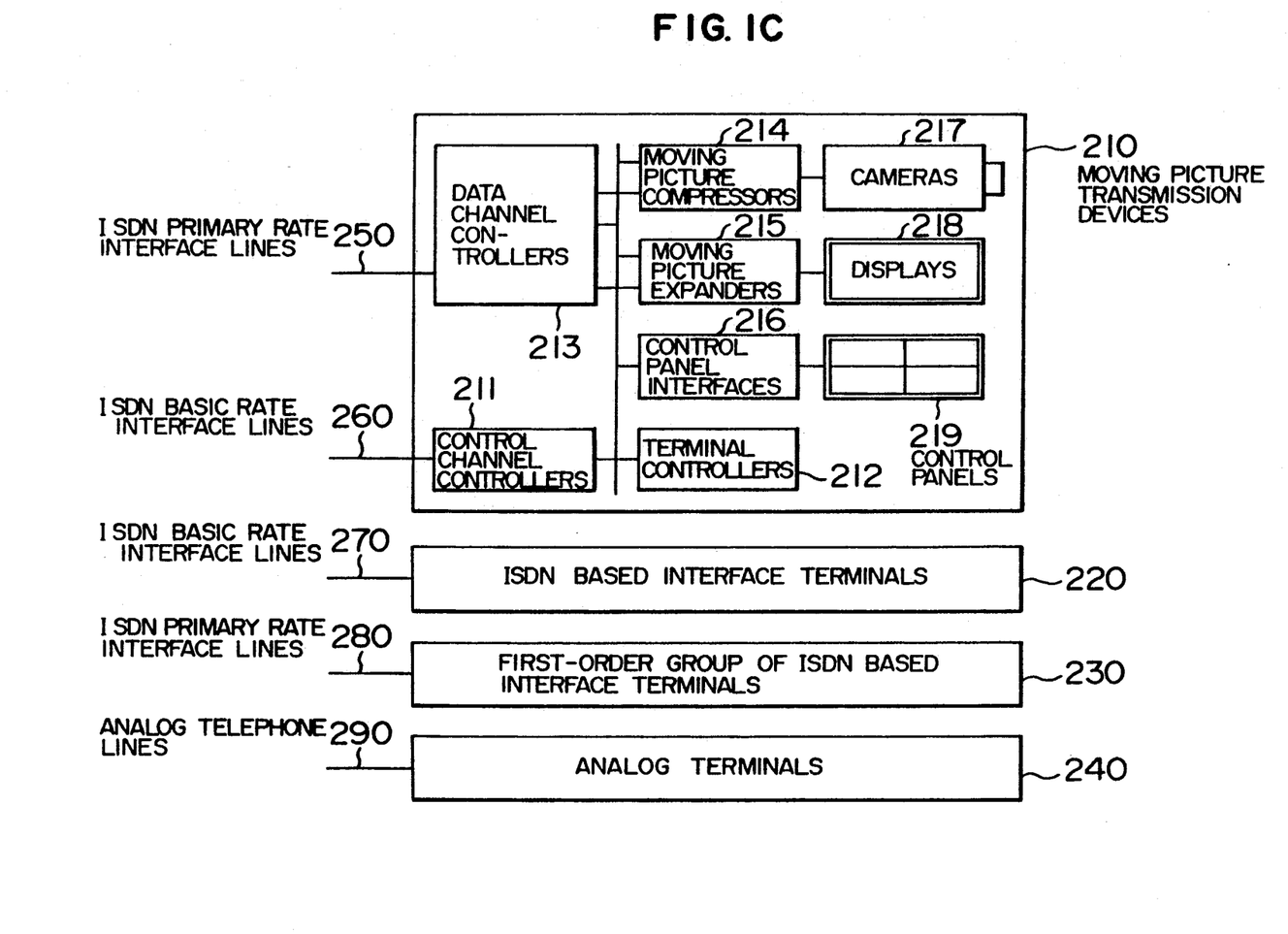

An embodiment of the present invention will be explained with reference to the accompanying drawings. FIG. 1 (FIG. 1A, FIG. 1B, FIG. 1C) is an arrangement of a communication system in accordance with an embodiment of the present invention, while FIGS. 2, 3, 4 and 5 are diagrams for explaining the protocol and table structure used in the system.

Figure 5A:
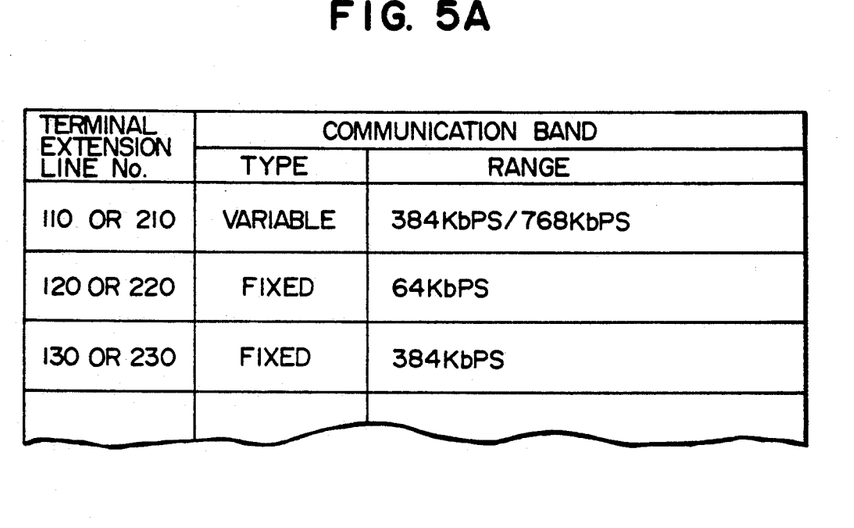
FIGS. 5(A) and 5(B) are examples of respective tables stored in terminal data memories.
Figure 5B:
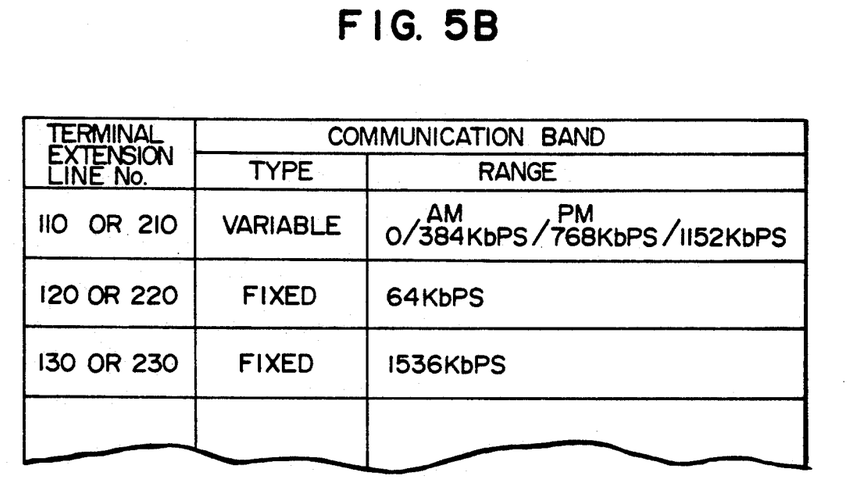

Referring first to FIG. 1, the system of FIG. 1 includes an exchange network 400 which in turn has exchanges 100 and 200. More in detail, the exchanges 100 and 200 comprise integrated services digital network (ISDN) basic rate interface line controllers 103, 104 and 203 and 204 connected respectively to ISDN basic rate interface lines 160, 170 and 260, 270, ISDN primary rate interface line controllers 102, 105 and 202, 205 connected respectively to an ISDN primary rate interface lines 150, 180 and 250, 280, analog telephone line controllers 106 and 206 connected to analog telephone lines 190 and 290, high-speed digital leased line controllers 107 and 207 connected to a high-speed digital leased line 300 connected between the exchanges 100 and 200, exchange switches 108 and 208 for performing switching operations between the extension lines of terminals 110, 120, 130, 140 and 210, 220, 230, 240 connected to the exchanges, e.g., between the extension lines of the terminals 120, 140 and 220, 240 or between these extension lines and the high-speed digital leased line, terminal data memories 109 and 209 for storing therein terminal data including the communication band type of a variable band terminal which can change its communication band therein, e.g., of such a moving picture transmission device as a television conference device and also including its communication range, and main controllers 101 and 201 connected to the above parts for controlling the parts, respectively. The terminal data memories 109 and 209 have such tables, for example, as shown in FIG. 5 respectively. More specifically, each table shows a relationship between the extension terminal No. for each terminal, the band type indicative of whether or not the associated communication band is variable and the associated range data (such as 384 kbps/768 kbps, etc.).

The terminals 110 and 210, which can change their communication bands, comprise respectively such a moving picture transmission device as a television conference device mentioned above. The moving picture transmission devices 110 and 210 have control channel controllers 111 and 211 connected to the ISDN basic rate interface lines 160 and 260 (including a D channel), data channel controllers 113 and 213 connected to the ISDN primary rate interface lines 150 and 250, cameras 117 and 217, moving picture compressors 114 and 214 for compressing respective moving pictures from the cameras, moving picture expanders 115 and 215 for expanding the respective moving pictures of the cameras, displays 118 and 216 for displaying the moving pictures thereon, control panels 119 and 219, control panel interfaces 116 and 216, and terminal controllers 112 and 212 connected to the aforementioned controllers 111, 113, compressor 114, expander 115, interfaces 116, 212, 213, 114, 215, 216 for controlling these parts, respectively. The moving picture transmission devices 110 and 210 use the respective D channels of the ISDN basic rate interface lines 160 and 260 in the control of call setting (call setting message, answering message) between the terminals and in the communication of band data (allocated-band notifying message), and also use one or more than one H0 channel of the ISDN primary rate interface lines 150 and 250 in the transmission of the moving picture.

As an example, the terminals 120 and 220 may be such ISDN basic rate interface terminals as a telephone set(s) and/or a G4 facsimile machine(s) connected to the ISDN basic rate interface lines 170 and 270, the terminals 130 and 230 may be such an ISDN primary rate interface terminals as a computer(s) and/or a picture terminal(s) having a fixed communication band connected to the ISDN primary rate interface lines 180 and 280, and the terminals 140 and 240 may be such terminals as a telephone set(s) and/or a G3 facsimile machine(s) connected to the analog telephone lines 190 and 290.

Although each of the terminals comprises a single terminal in the above embodiment, each terminal may comprise a plurality of terminals or some of the terminals may be omitted with the same arrangement.

Explanation will next be made as to the call setting (communication start) protocol between the moving picture transmission devices 110 and 210 and as to the protocols for increasing and decreasing the communication band, by referring to the drawings.

Figure 2:
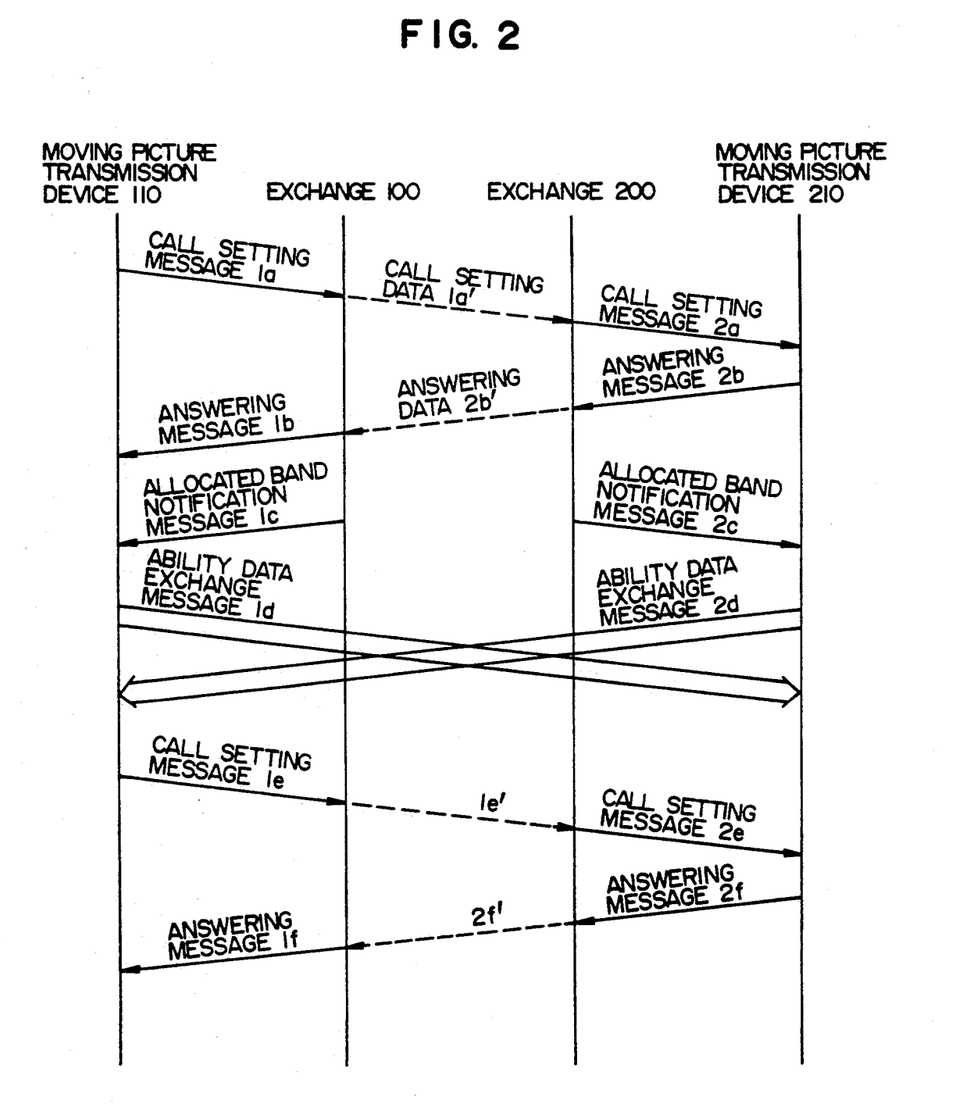
FIG. 2 is a diagram for explaining a communication start procedure between moving picture transmission devices.

First of all, the call setting (communication start) protocol will be explained with reference to FIGS. 1 and 2. In FIG. 2, single lines represent communication lines on the D channel of the ISDN basic rate interface lines 160 and 260; while double lines represent communication lines on the H0 channel of the ISDN primary rate interface lines 150 and 250. FIG. 2, further, shows the case where two of the H0 channels can be used. Explanation of the other part of the procedure, which is not directly related to the present invention, is omitted.

In the drawing, the terminal controller 112 of the moving picture transmission device 110, when receiving a user's call setting operation from the control panel 119, i.e., a call setting command (setting operation for the first H0 channel), sends an instruction to the control channel controller 111 to issue a call setting message therefrom. The control channel controller 111, when receiving the command from the terminal controller 112, sends a call setting message 1a to the ISDN basic rate interface line 160. That is, the call setting message 1a is supplied from the control channel controller 111 to the ISDN based interface line controller 103 of the exchange 100. The controller 103, when receiving the message 1a, issues a notification indicative of the reception of the message to the main controller 101. The main controller 101, when receiving the notification, issues to the high-speed digital leased line controller 107 a command to output a call setting data 1a' of the call setting message 1a onto the high-speed digital leased line 300 from the controller 107. The controller 107, when receiving the command, outputs the call setting data 1a' onto the high-speed digital leased line 300. The call setting data 1a' is supplied to the high-speed digital leased controller 207 of the exchange 200. The controller 207, when receiving the call setting data 1a', issues to the main controller 201 a notification indicative of the reception of the call setting data. The main controller 201, when receiving the notification, issues to the ISDN basic rate interface line controller 203 a command indicative of output of a call setting message 2a from the controller 203 to the ISDN basic rate interface line 260. The controller 203, when receiving the command from the controller 207, outputs the call setting message 2a onto the line 260. The call setting message 2a is then supplied to the control channel controller 211 of the moving picture transmission device 210.

The controller 211, when receiving the call setting message 2a, issues to the terminal controller 212 a notification indicative of the reception of the call setting message. The terminal controller 212, when receiving the notification from the controller 211, issues to the control channel controller 211 a command indicative of output of an answering message 2b from the control channel controller 211 to the line 260. The controller 211 responsive to the command outputs the answering message 2b to the line 260. The the answering message 2b is then supplied to the line controller 203 of the exchange 200. The controller 203, when receiving the answering message 2b, issues to the main controller 201 a notification indicative of the reception of the answering message. The main controller 201, when receiving the notification, issues to the controller 207 a command indicative of output of an answering data 2b' of the answering message 2b from the controller 207 to the high-speed digital leased line controller 300.

The main controller 201 retrieves the terminal data memory 209, decides the usable communication band and range of the moving picture transmission device 210 as well as a communication allocation band to the moving picture transmission device 210 on the basis of the usage ratio of the high-speed digital leased line 300, issues to the controller 203 a command indicative of output of an allocated-band notification message 2c (communication band change request) from the controller 203 to the line 260 based on the communication band data, and also control the exchange switch 208 to set a communication path between the ISDN primary rate interface line controller 202 and the high-speed digital leased line controller 207 (connect the controllers 202 and 207). The control channel controller 211 of the moving picture transmission device 210 receives the aforementioned allocated-band notification message 2c and informs the terminal controller 212 of the reception of the allocated-band notification message 2c. The controller 212 controls the data channel controller 213 which in turn, under control of the controller 212, outputs onto the ISDN primary rate interface line 250 an ability data exchange message 2d indicative of use of a band width specified by the allocated band data of the allocated-band notification message 2c as its own terminal transfer rate ability. The ability data exchange message 2d is sent to the high-speed digital leased line 300 through the communication path set by the exchange switch 208 as mentioned above.

The high-speed digital leased line controller 107 of the exchange 100 receives the answering data 2b' from the line 300 and issues to the main controller 101 a notification indicative of the reception of the answering data. The main controller 101, when receiving the notification, controls the line controller 103 which in turn outputs an answering message 1b onto the line 160 under control of the controller 101.

The main controller 101 retrieves the terminal data memory 109, decides the usable communication band and range of the moving picture transmission device 110 as well as a communication allocation band to the moving picture transmission device 110 on the basis of the use frequency of the high-speed digital leased line 300, issues to the controller 103 a command indicative of output of an allocated-band notification message 1c (communication band change request) from the controller 103 to the line 160 based on the communication band data, and also control the exchange switch 108 to set a communication path between the ISDN primary rate interface line controller 102 and the high-speed digital leased line controller 107 (connect the controllers 102 and 107). The controller 107 transmits the ability data exchange message 2d of the leased line 300 to the exchange switch 108 and then is guided via the aforementioned communication path to the interface line 150.

The control channel controller 111 of the moving picture transmission device 110 receives the answering message 1b and the allocated-band notification message 1c, and issues to the terminal controller 112 a notification indicative of the reception of these messages. The terminal controller 112, when receiving the notification from the controller 111, controls the data channel controller 113, which in turn, under control of the controller 111, outputs onto the ISDN primary rate interface line 150 an ability data exchange message 1d indicative of use of a band width specified by an allocated band data 1c' of the allocated-band notification message 1c as its own terminal transfer rate ability. The ability data exchange message 1d is sent to the ISDN primary rate interface line 250 via such a communication path as mentioned above, that is, via the ISDN primary rate interface line controller 102, exchange switch 108, the high-speed digital leased line controller 107, the high-speed digital leased line 300, the high-speed digital leased line controller 207, exchange switch 208 and the ISDN primary rate interface line 202. The data channel controller 213 of the moving picture transmission device 210 receives the ability data exchange message 1d and issues to the terminal controller 112 a notification indicative of the reception of the ability data exchange message. The terminal controller 112 compares the communication band indicated in the ability data exchange message 1d with the communication band indicated in the ability data exchange message 2d and decides smaller one of the both communication bands as a communication band to be actually used. In the example of FIG. 2, the two H0 channels are used so that, after setting of the first H0 channel is completed, setting of the second H0 channel is carried in the same manner as mentioned above. That is, the moving picture transmission device 110 sends a call setting message 1e to the exchange 100. The exchange network 400 operates in the same manner as the above and sends a call setting message 2e to the moving picture transmission device 210. The moving picture transmission device 210 sends a answering message 2f to the exchange network 400, which in turn sends an answering message 1f to the moving picture transmission device 110. As a result, the second H0 channel can be used. The terminal controllers 112 and 212 of the moving picture transmission devices 110 and 210 set a moving picture compression rate between the moving picture compressors 114, 214 and the moving picture expanders 115, 215 to correspond to 2 H0 (=768 kbps), and operate the data channel controllers 111 and 211 to start the transmission of the moving picture, respectively.

Figure 3:
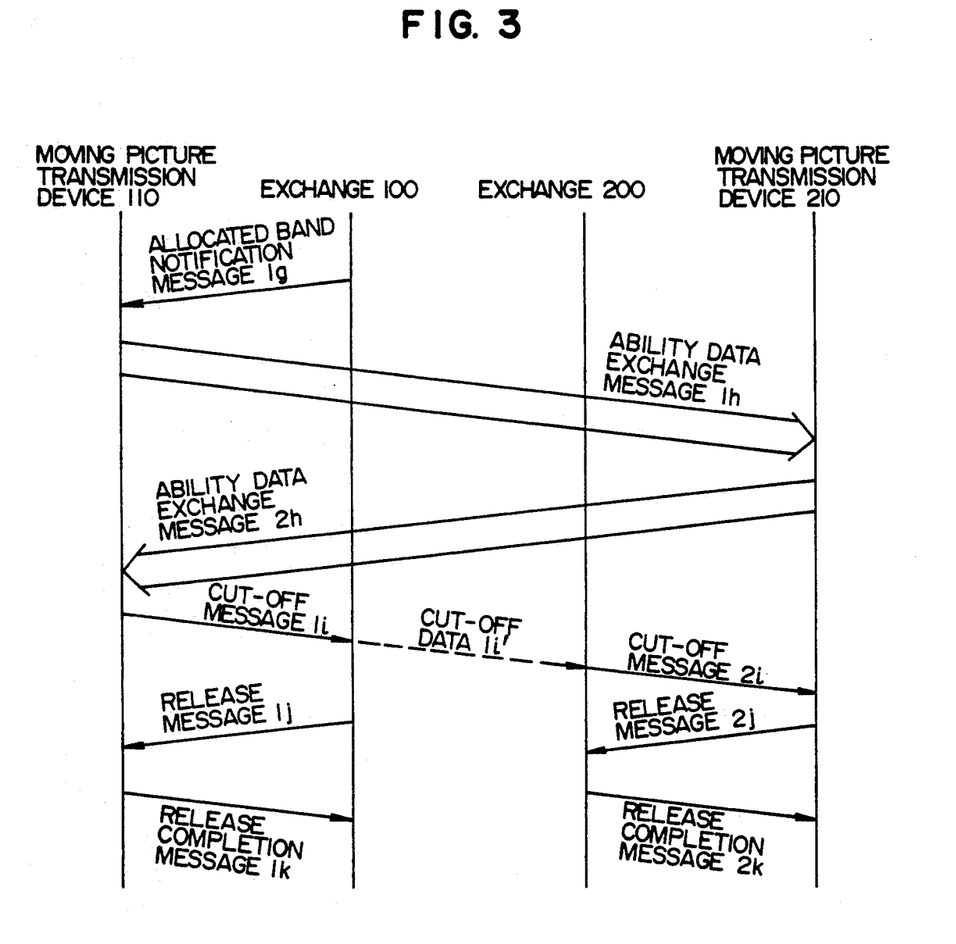
FIG. 3 is a diagram for explaining a procedure of decreasing a communication band.

Explanation will then be made as to a procedure of reducing the communication band during the communication after the aforementioned call setting operation, by referring to FIG. 3. The main controller 101 of the exchange 100, when detecting that the use frequency of the high-speed digital leased line 300 becomes higher than a predetermined value, retrieves the terminal data memory 109 to examine the presence or absence of at least one moving picture transmission device in the terminals 110, 120, 130 and 140 in communication. This is realized by checking the presence or absence of the extension terminal No. having a variable communication band in the table (refer to FIG. 5) of the memory 109. When the moving picture transmission device 110 is present as shown in FIG. 1 and can communicate below the communication band currently being used by the terminal, the moving picture transmission device 110 controls the ISDN primary rate interface line 103 which in turn, under control of the controller 110, sets a reduced allocated-band data in an allocated-band notification message 1g and sends the message 1g onto the ISDN basic rate interface line 160. Whether or not the terminal 110 is communicatable below the communication band currently being used can be known by checking the associated communication band range of the table of the memory 109. The control channel controller 111 of the moving picture transmission device 110, when receiving the allocated-band notification message 1g, informs the terminal controller 112 of the reception of the message 1g. The terminal controller 112 controls the data channel controller 113 which in turn, under control of the controller 112, sends to the exchange network 400 an ability data exchange message 1h indicative of use of the band width specified by the allocated-band data within the allocated-band notification message 1g as its own terminal transfer rate ability. The exchange network 400 sends the ability data exchange message 1h to the moving picture transmission device 210. The data channel controller 213 of the moving picture transmission device 210, when receiving the ability data exchange message 1h, informs the terminal controller 212 of the reception of the message 1h. The terminal controller 212, when receiving the message 1h, controls the moving picture compressor 214, moving picture expander 215 and data channel controller 213, sets the moving picture companding ratio of the moving picture transmission device 210 to correspond to one H0 (=384 kbps), and stops the use of the second H0 channel. The terminal controller 212 controls the data channel controller 213 and sends to the exchange network 400 an ability data exchange message 2h indicative of use of the same communication band as the specification band of the ability data exchange message 1h. The ability data exchange message 1h is used to be transferred between the moving picture transmission devices 110 and 210 to know whether or not the communication band can be changed to the allocated band by the exchange network 400. The exchange network 400 sends the ability data exchange message 2h to the moving picture transmission device 110. The data channel controller 113 of the moving picture transmission device 110, when receiving the ability data exchange message 2h, informs the terminal controller 112 of the reception of the message 2h. The terminal controller 112 operates the moving picture compressor 114, the moving picture expander 115 and data channel controller 113 to stop the use of the second H0 channel. The terminal controller 112 also controls the control channel controller 111 to send a disconnect message 1i to ISDN basic rate interface line 160. The ISDN basic rate interface line controller 103 of the exchange 100, when receiving the disconnect message 1i, informs the main controller 101 of the reception of the message 1i. The main controller 101 controls the high-speed digital leased line controller 107 which in turn, under control of the controller 101, sends a disconnect data 1i' to the high-speed digital leased line 300. The main controller 101 controls the ISDN basic rate interface line controller 103 which in turn, under control of the controller 101, sends a release message 1j to the ISDN basic rate interface line controller 103. The main controller 101 also controls the exchange switch 108 to release the communication path which has been allocated to the second H0 channel. The high-speed digital leased line controller 207 of the exchange 200 informs the main controller 201 of the disconnect data 1i' received from the high-speed digital leased line 300. The main controller 201 controls the ISDN basic rate interface line controller 203 which in turn, under control of the controller 201, sends to the ISDN basic rate interface line 260 the disconnect data 1i' as a disconnect message 2i. The main controller 201 also controls the high-speed digital leased line controller 207 and exchange switch 208 to release the communication path allocated to the second H0 channel. The control channel controller 211 of the moving picture transmission device 210, when receiving the disconnect message 2i, informs the terminal controller 212 of the reception of the message 2i. The terminal controller 212 controls the control channel controller 211 which in turn, under control of the controller 212, sends a release message 2j to the ISDN basic rate interface line 260. The ISDN basic rate interface line controller 203 of the exchange 200 informs the main controller 201 of the reception of the release message 2j. The main controller 201 controls the ISDN basic rate interface line controller 203 which in turn, under control of the controller 201, sends a release completion message 2k to the ISDN basic rate interface line 260. The control channel controller 211 of the moving picture transmission device 210 informs the terminal controller 212 of the reception of the release completion message 2k. The control channel controller 111 of the moving picture transmission device 110 informs the terminal controller 112 of the reception of the release message 1j. The terminal controller 112 operates the control channel controller 111 to send a release completion message 1k to the ISDN basic rate interface line 160. The ISDN basic rate interface line controller 103 of the exchange 100 informs the main controller 101 of the reception of the release completion message 1k.

When part of the communication path is released according to such a procedure as mentioned above, the use frequency of the high-speed digital leased line 300 can be decreased by an amount corresponding to the H0 channel, and thus the other ISDN basic rate interface terminal 120, the ISDN primary rate interface terminal 130 and analog terminal 140 can use the high-speed digital leased line 300.

Figure 4:
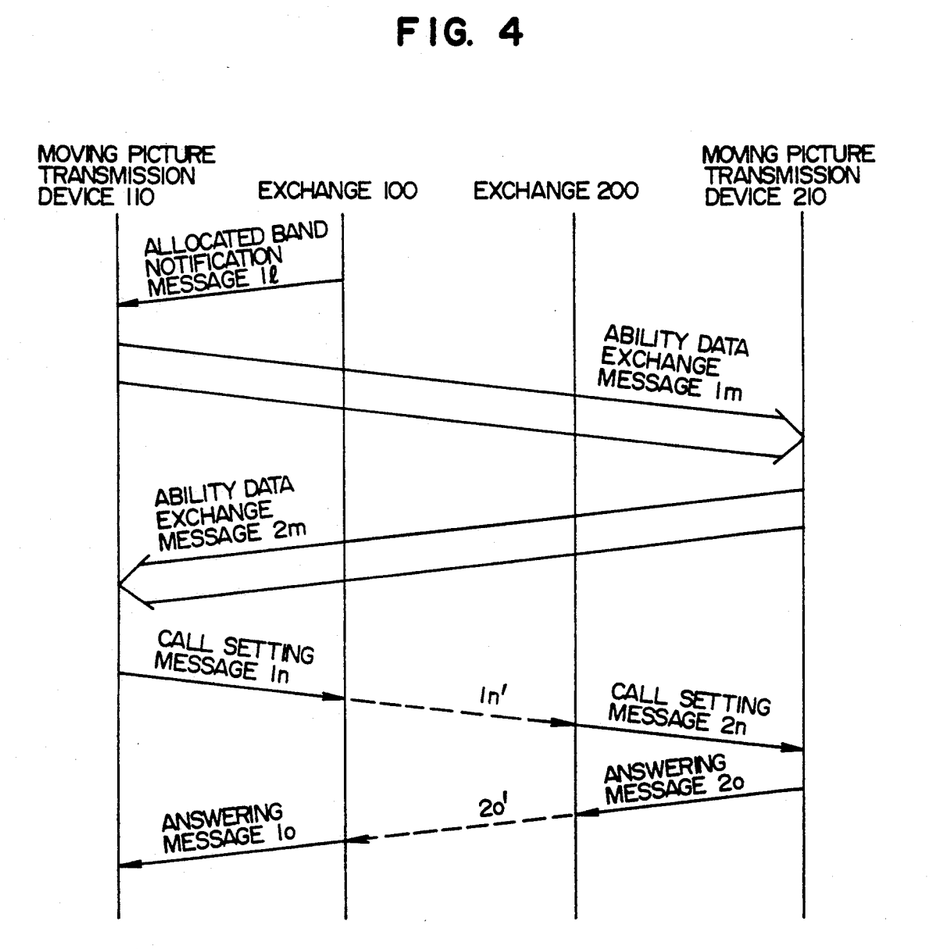
FIG. 4 is a diagram for explaining a procedure of increasing a communication band.

Explanation will next be made as to a procedure of expanding the communication band being communicated. The main controller 101 of the exchange 100, when detecting that the use frequency of the high-speed digital leased line 300 becomes larger than a predetermined value, retrieves the terminal data memory 109 to examine whether or not the terminal in communication is of the moving picture transmission device. When the moving picture transmission device 110 is present and is communicatable above the communication band currently being used by the terminal, the moving picture transmission device 110 controls the based ISDN basic rate interface line controller 103 which in turn, under control of the device 110, sets an enlarged allocated-band data in an allocated-band notification message 1l to send the message 1g to the ISDN basic rate interface line 160. The control channel controller 111 of the moving picture transmission device 110 informs the terminal controller 112 of the reception of the allocated-band notification message 1l. The terminal controller 112 controls the data channel controller 113 which in turn, in order to change the communication band to the allocated band, sends to the exchange network 400 an ability data exchange message 1m indicative of use of the band width specified by the allocated band data within the allocated-band notification message 1l as its own terminal transfer rate ability under control of the controller 112. The exchange network 400 sends the ability data exchange message 1m to the moving picture transmission device 210. The data channel controller 213 of the moving picture transmission device 210 informs the terminal controller 212 of the reception of the ability data exchange message 1m. The terminal controller 212 receives the message 1m and controls the data channel controller 213 which in turn, under control of the controller 212, send to the exchange network 400 an ability data exchange message 2m indicative of use of smaller one of its own terminal transfer rate ability and the allocated band indicated in the allocated band notification received lastly from the exchange 200 as its own terminal transfer rate ability. The exchange network 400 sends the ability data exchange message 2m to the moving picture transmission device 110. The data channel controller 113 of the moving picture transmission device 110 informs the terminal controller 112 of the reception of the ability data exchange message 2m. The terminal controller 112 determines smaller one of the communication band indicated in the ability data exchange message 1m and the communication band indicated in the ability data exchange message 2m as a communication band to be actually used. FIG. 4 shows the case where an additional one H0 channel can be used. More specifically, the second H0 channel can be used through the transfer of call setting messages 1n and 2n and answering messages 1o and 2o between the moving picture transmission devices 110 and 210 in the same manner as the call setting message 1e and 2e and answering messages 1f and 2f in FIG. 2. The terminal controllers 112 and 212 of the moving picture transmission devices 110 and 210 set the moving picture companding ration between the moving picture compressors 114 and 214 and the moving picture expanders 115 and 215 to correspond to 2H0 (=768 kbps) and operate the data channel controller 111 and 211 to restart the transmission of the moving picture.

Although the allocated band from the exchange network 400 has been unconditionally used for the moving picture transmission device 110 in the foregoing embodiment, the control panel 119 may have a function of, for example, turning ON/OFF the setting of a high definition mode, whereby, when the terminal user set the high definition mode, band reduction can be carried out. To this end, the moving picture transmission device 110 is arranged merely to ignore the allocated-band notification from the exchange network 400.

As an alternative, the moving picture transmission device 110 may be arranged, when receiving the allocated-band notification from the exchange network 400, to operate the moving picture expander 115 and to display on the display 118 an inquiry saying whether or not the band change is effected by the terminal user and to determine the change or non-change of the band change through user's input from the control panel 119.

Further, picture transmission device 110 may be arranged to operate the moving picture expander 115 and to display the communication band width being used on the display to allow the terminal user to visually know the communication band width on the display.

Though the exchange 100 performs its band width changing operation depending on the use frequency of the relay line in the foregoing embodiment, band widths previously allocated to the moving picture transmission device 110 with respect to different time bands may be set for the exchange 100 so that the moving picture transmission device 110 can perform its band width changing operation according to the set data therein.

Further, the exchange 100 may perform its band width changing operation based on the use frequency of the exchange switch 108.

The communication band data which picture transmission device 110 can use is previously set in the terminal data memory 109 in the foregoing embodiment. However, a procedure for informing the exchange 100 of the communication band data which the picture transmission device 110 can use may be added to the calling procedure between the picture transmission device 110 and the exchange 100, so that, each time the picture transmission device 110 calls, the communication band data can be stored in the exchange.

The communication mode of the picture transmission device 110 may be changed during communication through the control panel 119 so that, each time the usable communication band width is changed, the procedure for informing the exchange 100 of the usable communication band data can be added.

Further, the moving picture transmission device 110 is used as the variable band terminal in the foregoing embodiment, but a television conference device may be similarly employed for the variable band terminal.

Furthermore, transmission band width of zero may be set as one of the usable communication band widths in the moving picture transmission device 110, zero may be provided in the communication band range in the table of the terminal data memory of the exchange 400, in which case, a moving picture frame, which has been already received prior to it, may also be displayed in the form of a still picture.

In accordance with the present invention, the communication band to be used between the moving picture transmission devices can be controlled from the exchange network. As a result, the moving picture transmission device can use its maximum band when a sufficient amount of resources are provided within the exchange network, while the band to be used by the moving picture transmission device is decreased to allow communication of another terminal when a less amount of resources are provided within the exchange network, whereby the moving picture transmission device can connect as many calls as possible even in its communication mode.

What is claimed is:

1. A communication system comprising:
   a plurality of variable bandwidth terminals each being allocatable to a plurality of different bandwidths for communication; and
   an exchange network connected between said plurality of terminals for carrying out communication between said terminals through said exchange network,
   wherein said exchange network outputs communication bandwidth change requests including allocated-bandwidth data to a communicating pair of variable bandwidth terminals, and wherein each terminal of said communicating pair of variable bandwidth terminals, when receiving said communication bandwidth change requests, determines a communication bandwidth depending on said allocated bandwidth data and a use condition of each of said variable bandwidth terminals and executes communication procedures for communication based on said communication bandwidth.

2. A communication system as set forth in claim 1, wherein each terminal of said communicating pair of variable bandwidth terminals, when receiving said communication bandwidth change requests, performs transfer of the communication bandwidth data with the other terminal of said communicating pair of terminals and sets a communication bandwidth on the basis of said data transfer.

3. A communication system as set forth in claim 1, wherein each terminal of said communicating pair of terminals is a moving picture transmission device, and when said moving picture transmission device is communicatable at a bandwidth less than that allocated, said exchange network outputs the communication bandwidth change requests each including reduced allocated-bandwidth data to said moving picture transmission device through said exchange network, and wherein said moving picture transmission device outputs ability data exchange messages indicative of use of bandwidths specified by said reduced allocated bandwidth data as its communication terminal transfer rate abilities to reduce the communication bandwidth between said moving picture transmission devices of said communicating pair of terminals on the basis of said ability data exchange messages.

4. A communication system as set forth in claim 1, wherein each terminal of said communicating pair of terminals is a moving picture transmission device, and when said moving picture transmission device is communicatable at a bandwidth greater than that allocated, said exchange network outputs the communication bandwidth change requests each including an enlarged allocated-bandwidth data to said moving picture transmission device through said exchange network, and wherein said moving picture transmission device outputs ability data exchange messages indicative of use of bandwidths specified by said reduced allocated bandwidth data as its communication terminal transfer rate abilities to enlarge the communication bandwidth between said moving picture transmission devices of said communicating pair of terminals on the basis of said ability data exchange messages.

5. A communication system as set forth in claim 1, wherein output of said communication bandwidth change requests by said exchange network is carried out at the time of call setting for said communicating pair of variable bandwidth terminals.

6. A communication system as set forth in claim 1, wherein output of said communication bandwidth change requests by said exchange network is carried out during communication between said communicating pair of variable bandwidth terminals.

7. A communication system as set forth in claim 1, wherein each terminal of said communicating pair of terminals, when receiving the allocated communication bandwidth data of said communication bandwidth change requests from said exchange network, transmits communication bandwidth data of communication ability data to the other terminal of said communicating pair of terminals and determines a smaller one of the communication bandwidth data of the communication ability data of said terminal and the other terminal as a communication bandwidth to be actually used.

8. A communication system as set forth in claim 1, wherein each of said variable bandwidth terminals, when receiving the allocated communication bandwidth data of the communication bandwidth change request, inquires a user of the variable bandwidth terminal about communication or non-communication with the allocated communication bandwidth of the communication bandwidth change request to determine whether or not the communication bandwidth is set to the allocated communication bandwidth.

9. A communication system as set forth in claim 1, wherein each of said variable bandwidth terminals, when receiving the allocated communication bandwidth data from said exchange network, determines whether or not to carry out communication bandwidth setting based on said allocated communication bandwidth data according to a communication bandwidth mode previously set by a user of the terminal.

10. A communication system as set forth in claim 1, wherein each of said variable bandwidth terminals displays the communication band-width being used.

11. A communication system as set forth in claim 1, wherein said exchange network outputs said communication bandwidth change requests to said variable bandwidth terminals according to a use frequency of a relay line within said exchange network.

12. A communication system as set forth in claim 1, wherein said exchange network outputs said communication bandwidth change request to said variable bandwidth terminals according to use frequencies of an exchange switch and a highway within said exchange network.

13. A communication system as set forth in claim 1, wherein said exchange network outputs said communication bandwidth change request according to the communication bandwidth data previously set as allocated to said variable bandwidth terminals with respect to different times.

14. A communication system as set forth in claim 1, wherein said exchange network determines a communication bandwidth and the terminal to which said communication bandwidth is informed according to the communication bandwidth data which said previously-set variable bandwidth terminals can use.

15. A communication system as set forth in claim 1, wherein said variable bandwidth terminals inform said exchange network of a usable communication bandwidth data during calling procedure, and said exchange network previously stores said usable communication bandwidth data therein to determine a communication bandwidth and the terminal to which the communication bandwidth is informed.

16. A communication system as set forth in claim 1, wherein said variable bandwidth terminals inform said exchange network of a usable communication bandwidth data each time a usable communication bandwidth is varied during communication, and said exchange network previously stores said usable communication bandwidth data therein to determine a communication bandwidth and the terminal to which the communication bandwidth is informed.

17. A communication system as set forth in claim 1, wherein each of said variable bandwidth terminals is a television conference device.

18. A communication system as set forth in claim 1, wherein each of said variable bandwidth terminals is a moving picture transmission device using a large scale display.

19. A communication system as set forth in claim 18, wherein a moving picture transmission bandwidth of said moving picture transmission device is temporarily set to be zero, during which a picture frame already received so far is displayed in the form of a still picture.

20. A communication system comprising:
a plurality of variable bandwidth terminals each being allocatable to a plurality of different communication bandwidths for communication;
an exchange network; and
line means including first and second lines connected between said variable bandwidth terminals and said exchange network;
wherein communication between said variable bandwidth terminals is carried out through said exchange network, said exchange network has first and second exchanges and a common line connected between said first and second exchanges;
said first and second exchanges each comprising:
terminal data memory means for storing terminal attribute data of said variable bandwidth terminals,
control means including a communication bandwidth decider for determining an allocated communication bandwidth to said variable bandwidth terminals on the basis of the terminal attribute data stored in said terminal data memory means,
data communication means for transmitting allocated communication bandwidth data corresponding to the allocated communication bandwidth of said control means to said variable bandwidth terminals through said first lines of said line means, and
transmission means for receiving ability data exchange messages to be transmitted from said variable bandwidth terminals to the second lines of said line means and for transmitting said messages to the party terminal of said variable bandwidth terminals, respectively;
said variable bandwidth terminals each comprising:
data communication means for receiving said allocated communication bandwidth data to be transmitted from said exchange network through said first lines,
means, when receiving said allocated communication bandwidth data, for transmitting to the second lines of said line means said ability data exchange messages indicative of use of bandwidths specified by said received allocated communication bandwidth as terminal transfer rate abilities thereof, and
communication bandwidth setting means for receiving said ability data exchange messages from said exchange network and for setting smaller one of the communication bandwidths indicated in said messages as a communication bandwidth for said second lines.

21. A communication system as set forth in claim 20, wherein the first lines of said line means are ISDN basic rate interface lines, the second lines of said line means are ISDN primary rate interface lines having a plurality of communication channels, said common line is a high-speed digital leased line, said transmission means comprising:

ISDN primary rate interface line controllers connected to the ISDN primary rate interface lines of said second lines for receiving said ability data exchange messages and for informing said control means of reception of said messages;

high-speed digital leased line controllers connected to the high-speed digital leased line of said common line; and exchange switches connected to said ISDN primary rate interface line controllers and said control means and when receiving a reception notification of said ability data exchange messages, for connecting said ISDN primary rate interface line controllers and said highspeed digital leased line controllers, said communication bandwidth setting means comprising controllers connected to data channel controllers for outputting said ability data exchange messages to the ISDN primary rate interface lines of said second lines and also connected to control data communication means for controlling the data channel controllers in response to reception of said allocated communication bandwidth data.

22. A communication system as set forth in claim 20, wherein, at the time of setting the communication bandwidth of said second lines, a communication path of said transmission means is closed or opened according to said communication bandwidth to increase or decrease a use frequency of said high speed digital leased line.

23. A communication system as set forth in claim 20, wherein the terminal attribute data stored in said terminal data memory means include types and ranges of the communication bandwidths for said respective terminals.

24. A communication system as set forth in claim 23, wherein the ranges of said communication bandwidths have time data.

25. A communication system comprising:
a plurality of variable bandwidth terminals each being allocatable to a plurality of different communication bandwidths for communication;
an exchange network; and
line means including first and second lines connected between said variable bandwidth terminals and said exchange network;
wherein communication between said variable bandwidth terminals is carried out through said exchange network, said exchange network has first and second exchanges and a common line connected between said first and second exchanges;
said first and second exchange each comprising:
terminal data memory means for storing terminal attribute data of said variable bandwidth terminals therein;
control means including a communication bandwidth decider for determining an allocated communication bandwidth to said variable bandwidth terminals on the basis of the terminal attribute data stored in said terminal data memory means and a communication use frequency of said common line,
data communication means for transmitting allocated communication bandwidth data corresponding to the allocated communication bandwidth of said control means to said variable bandwidth terminals through said first lines of said line means, and
transmission means for receiving ability data exchange messages of the second lines of said line means and for transmitting said messages to both said common line and the party terminal of said variable bandwidth terminals, respectively;

said variable bandwidth terminals each comprising:
data communication means for receiving said allocated communication bandwidth data to be supplied from said exchange network through said first lines,
means, when receiving said allocated communication bandwidth data, for transmitting to the second lines of said line means said ability data exchange messages indicative of use of bandwidths specified by said received allocated communication bandwidth data as terminal transfer rate abilities thereof, and
communication bandwidth setting means for receiving said ability data exchange messages from said exchange network and for setting smaller one of the communication bandwidths indicated in said messages as a communication bandwidth for said second lines.

26. In a communication system comprising a plurality of terminals including first and second moving picture transmission devices each being allocatable to a plurality of different communication bandwidths for communication, an exchange network, and a line including a D channel and first and second HO channels connected between said first and second moving picture transmission devices and said exchange network, wherein communication between said terminals is carried out through said exchange network and line, a communication method comprising the steps of:
sending and receiving first call setting messages and answering messages through the D channel of said transmission line between said first moving picture transmission device, said exchange network and said second moving picture transmission device;
transmitting first and second allocated bandwidth notification messages including allocated bandwidth data from said exchange network through said D channel to said first and second moving picture transmission devices;
transmitting first and second ability data exchange messages indicative of use of bandwidths specified by the allocated bandwidth data of said first and second allocated bandwidth notification messages as their own communication terminal transfer rate abilities from said first moving picture transmission device to said second moving picture transmission device and from said second moving picture transmission device to said first moving picture transmission device through said HO channels and said exchange network respectively;
setting a smaller one of the communication bandwidths indicated in said first and second ability data exchange messages as a communication bandwidth to be actually used:
when a communication use rate of the communication line of said exchange network is higher than a predetermined value and when said moving picture transmission devices can communicate at a bandwidth less than that allocated, transmitting a third allocated bandwidth notification message of a reduced allocated bandwidth data from said exchange network through said D channel to said first moving picture transmission device;
when said first moving picture transmission device receives said third allocated bandwidth notification message, transmitting a third ability data exchange message indicative of use of a bandwidth specified by its reduced allocated bandwidth data as its own communication terminal transmission rate ability to said second moving picture transmission device through said first HO channel and said exchange network;

when said second moving picture transmission device receives said third ability data exchange message, setting a moving picture compression ratio of the second moving picture transmission device to correspond to said first HO channel and also stopping use of said second HO channel;

when said second moving picture transmission device receives said third ability data exchange message, designating the same bandwidth as the specification bandwidth of said third ability data exchange message to transmit a fourth ability data exchange message to said first moving picture transmission device through said first HO channel and said exchange network;

when said first moving picture transmission device receives said fourth ability data exchange message, stopping the second HO channel of said first moving picture transmission device;

after said first and second moving picture transmission devices receive said third and fourth ability data exchange messages, cutting and opening the second HO channel of said first and second moving picture transmission devices;

when a use rate of the communication line of said exchange network is less than a predetermined value and when said first and second moving picture transmission devices can communicate at a bandwidth greater than that allocated, transmitting a fourth allocated bandwidth notification message of an enlarged allocated bandwidth data from said exchange network to said first moving picture transmission device;

when said first moving picture transmission device receives said third allocated bandwidth notification message, transmitting a fifth ability data exchange message indicative of use of a bandwidth specified by its reduced allocated bandwidth data as its own communication terminal transfer rate ability to said second moving picture transmission device through said first HO channel and said exchange network;

when said second moving picture transmission device receives said fifth ability data exchange message, setting a moving picture compression ratio of said second moving picture transmission device to correspond to said first HO channel and also stopping use of said second HO channel;

when said second moving picture transmission device receives said fifth ability data exchange message, designating the same bandwidth as the specification bandwidth of said fifth ability data exchange message to transfer a fifth ability data exchange message to said first moving picture transmission device through said first HO channel and said exchange network; and when said first moving picture transmission device receives said fifth ability data exchange message, sending and receiving second call setting messages and second answering messages between said terminals and said exchange network through said D channel and said exchange network.

* * * * *